Feb. 15, 1966  P. P. W. VARLET  3,235,437
DEVICE FOR COATING AND IMPREGNATING FLEXIBLE SHEETS
Filed Aug. 2, 1962
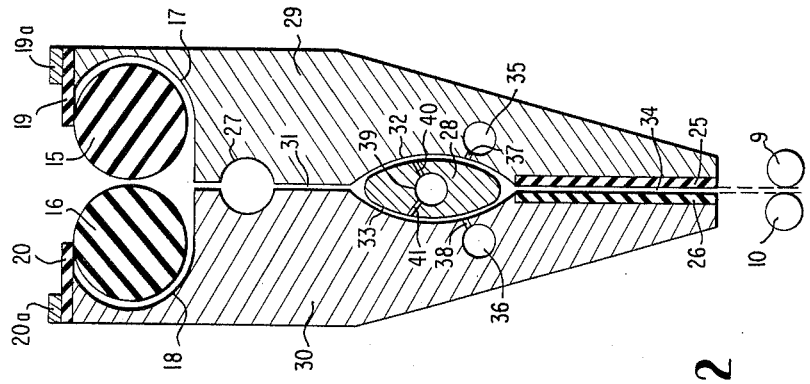
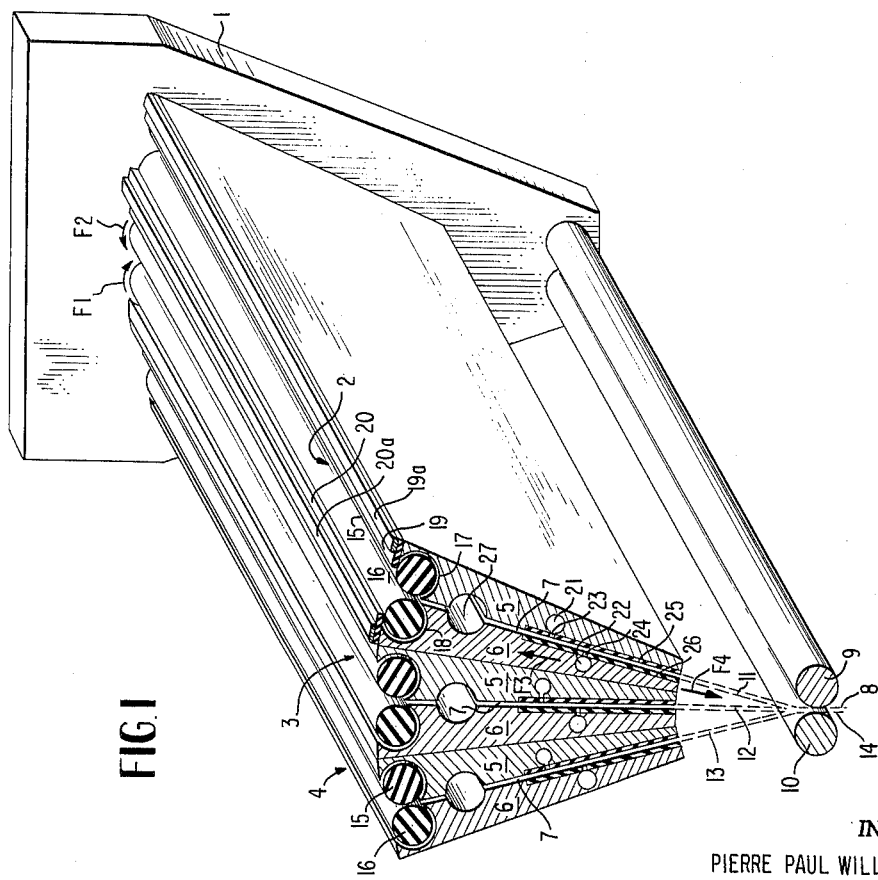
INVENTOR
PIERRE PAUL WILLIAM VARLET
BY  *Imirie and Smiley*
ATTORNEYS

United States Patent Office 3,235,437
Patented Feb. 15, 1966

3,235,437
DEVICE FOR COATING AND IMPREGNATING FLEXIBLE SHEETS
Pierre Paul William Varlet, Asnieres, Seine, France, assignor to Societe Anonyme des Usines Chausson, Asnieres, France, a French company
Filed Aug. 2, 1962, Ser. No. 214,317
Claims priority, application France, Sept. 4, 1961, 872,290, Patent 1,306,675
8 Claims. (Cl. 156—551)

The present invention relates to a device for coating and impregnating flexible reinforcement layers to form plastic sheets.

This device has the advantage of producing a homogeneous impregnation right through reinforcement layers, for example, strips of synthetic glass fibre fabric, whatever their texture, the shape of their meshes and the closeness of the latter.

The device also has another advantage of fulfilling its purpose with efficacy and with an excellent output during a continuous passage of reinforcement strips, which leads to a particularly interesting utilization in an equipment for the continuous manufacture of plastic sheets, so much the more seeing that the coated and impregnated strips are perfectly joined to each other, no matter what may be their number, at the exit from this device and that the thickness of the sheet obtained is calibrated with accuracy and homogeneity.

According to the invention, the device comprises support-plates confining as many channels for guiding reinforcement strips as there are layers of these strips to be impregnated; the plates also confining a chamber branched on a vacuum pump and emerging on both sides of each channel upstream from at least one duct cut in a plate for the distribution of a coating and impregnating material; and the plates further supporting two rollers of flexible material which press the corresponding reinforcement strip to isolate the exterior of the chamber from the vacuum.

Various other characteristics will moreover be revealed by the detailed description which follows.

Forms of embodiment of the purpose of the invention are shown by way of examples in the attached drawing.

FIGURE 1 is a perspective, partly cut away, showing a first method of carrying out the device of the invention.

FIGURE 2 is a side elevation-section showing a second method of carrying out this device.

According to the first form of embodiment shown in FIGURE 1, the device comprises two end plates 1, only one being visible in the drawing, supporting as many pairs of side plates 2, 3, 4 . . . for coating and impregnating reinforcement strips as layers of these strips in the finished plastic sheet. The pairs of side plates 2, 3, 4 . . . which are independent but contiguous, have a length appreciably equal to the maximum width that a plastic sheet can have.

Each pair of said plates 2, 3 or 4 is formed by two plates 5, 6 whose outer faces are convergent. These plates are fixed at the end by any suitable means on to the end plates 1 so as to confine a channel 7 between them of constant thickness for the passage of the corresponding reinforcement strip. The plates 5 are moreover in contact with the plates 6 of the contiguous pair of plates and, connected to the latter by assembling components (not shown). Then, the channels 7 of said elements converge towards a space so determined that the reinforcement strips are laid flat, and in any case, have no acute angle, this space separating two fixed calendering rollers 9, 10, placed between the end plates 1. The rollers 9, 10 which are fixed but adjustable, are separated by a constant distance equal to the thickness of the plastic sheets to be manufactured and enabling the coated reinforcement strips 11, 12, 13 to be joined by pressing them one against the other and accurately to calibrate said thickness of the plastic sheet 14 obtained.

The end plates 1, also support—opposite to the calendering rollers—two sealing rollers 15, 16 made of flexible material, such as rubber, for example, and placed in semi-cylindrical housings 17, 18 hollowed out in the upper parts of the plates 5, 6. The sealing rollers are separated, facing the channel 7, for a distance at least equal to the thickness of the reinforcement strips. The bearings which support them in the end plates can cooperate with adjustment components enabling the spacing of the rollers to be varied and include resilient components tending to bring the rollers together so that a steady pressure is exerted on the corresponding strip. These sealing rollers 15, 16 can be free, but it appears to be advantageous that they are coupled up to mechanisms rotatively driving in opposite directions (arrows $F_1$ and $F_2$), at a tangential speed rigorously equal to the passage speed of the strips. The mechanisms (not shown), must be adapted to the structure of the equipment applying the device.

Furthermore, each roller 15 or 16 is partially covered with a flexible strip 19 or 20, of rubber for example, fixed on the plate 5 or 6 by means of a band 19a or 20a. The strip 19 or 20 closes the housing 17 or 18 to ensure sealing upstream between the channel 7 and the exterior of the housing, the sealing being completed between the rollers 15 and 16 by the reinforcement strip continuously passing along.

Two ducts 21, 22 are cut in the plates 5, 6 respectively of each pair 2, 3 or 4 for conveying coating materials which, most frequently, are made of synthetic resins. The nature and composition of the resins conveyed by the ducts 21 may be identical with/or different from that of the resins conveyed by the ducts 22, in particular so that these resins may be stored independently during a relatively long period without risking an evolution of their state of balance towards a more advanced polymerization state. These resins are injected, under suitable pressure dependent to their viscosity, into said ducts which communicate with the corresponding channel 7 through holes 23, 24 uniformly distributed, drilled in the plates 5, 6 and in the linings 25, 26, made integral, by suitable means, with the latter in a zone situated down stream from a cylindrical chamber 27. It will be noticed that the ducts 21, 22 are placed at different levels, so that one of the resins distributed coats the reinforcement strip before the other resin, and that the mixture takes place during the impregnation period.

The linings 25, 26 are intended to prevent the coated and impregnated strip from sticking to the walls of the channel 7, for the resins utilized are generally viscous. These linings may advantageously be made of titanium or else by a material known under the name of "epopken" or else by epikote or epoxide resin.

Each chamber 27 is confined by the plates 5 and 6 of the corresponding pair 2, 3 or 4. It is branched on to a vacuum pump which creates—in this chamber situated downstream from the rollers 15, 16 and sealing strips 19, 20—a relatively considerable vacuum tending to cause the distributed resins to rise in counter-flow. Actually, the resins are sucked in the direction of the arrow $F_3$ whereas the reinforcement strip travels in the direction of the arrow $F_4$. Moreover, the resins penetrate and impregnate the latter with efficacy, for the vacuum is created on either side of said strip.

According to a second form of embodiment shown by FIGURE 2, the device comprises a sectional bar 28, inserted between two plates 29, 30 so shaped as to confine an upstream rectilinear channel 31, branched around this bar in two incurved channels 32, 33 coming together again in a downstream rectilinear channel 34. The plates and bar are supported, as in the preceding form of embodiment, by end plates 1. Nevertheless, retractable connection means are provided between these side plates and at least one of the plates for the sole purpose of facilitating the positioning of two reinforcement strips normally engaged in the channels 31 and 34 and separated by the bar 28 in the channels 32, 33.

In the case where the plastic sheet to be manufactured comprises more than two reinforcement strips for coating and impregnating, the device has two side plates 29, 30 surrounding as many sectional bars 28 as are required for confining a number of branched-out channels 32, 33 . . . equal to that of the number of strips.

Ducts 35, 36 for distributing a resin are cut in the plates 29, 30 and communicate through a series of holes 37, 38 with the incurved channels 32, 33 by emerging opposite to one of the faces of the corresponding reinforcement strips. Likewise, a duct 39 for distributing a resin, different or not, is cut in the sectional bar 27 and communicates through two series of holes 40, 41 with said incurved channels 32, 33 while emerging opposite the other face of these strips.

The second form of embodiment of the device of the invention comprises various other elements identical with those of the first form, and which are denoted hereafter by the same reference numbers. The plates 29, 30 confine in cooperation a chamber 27 branched on to a vacuum pump and emerge in a channel 31 upstream from the bar 28. Two sealing rollers 15, 16 are placed in housings 17, 18 communicating with this channel 31. Two flexible strips 19, 20 close the housing 17, 18 to isolate the depression chamber 27, which, moreover, cannot communicate with the exterior through the space separating the rollers 15, 16, because the strips to be impregnated pass between the latter. The channel 34 is bordered by linings 25, 26 preventing sticking. Lastly, the assembly thus described is associated with two calendering rollers 9, 10, fixed but adjustable, for pressing and calibrating the plastic strip obtained.

The device, carried out according to the second method shown in FIGURE 2, works in the same manner as that described for FIGURE 1. Actually, the vacuum created in the chamber 27, tends to suck in the resins distributed by the ducts 35, 36 and 39 in a direction opposite to that taken by the reinforcement strips. The latter being separated by the sectional bar 28, are coated and impregnated separately by the resins.

Various modifications may moreover be applied to the forms of embodiment, shown and described in detail, without going outside of the scope of the invention.

I claim:

1. Device for continuously coating both sides and impregnating with resin a flexible reinforcing strip moved at a substantially constant speed, comprising a pair of plates facing one another and spaced to delimit a thin passage therebetween through which said strip is moved, said plates being fixedly connected at opposite sides to supporting members which close said thin passage at the sides of the moving strip, each of said plates having a resin supply channel transverse to the direction of movement of said strip and a series of distributing holes communicating said resin supply channel with said thin passage for coating the opposite sides of a strip moving through the passage, each of said plates being provided with a vacuum chamber upstream of said resin supply channel for application of vacuum to cause impregnation of a strip moving in said passage, and sealing means on said plates at the entry end of said thin passage upstream of said vacuum chamber for cooperating with an entering strip to prevent air leakage into said passage.

2. A device for continuously impregnating and coating both sides of each of a plurality of reinforcing strips moved at a substantially constant speed, comprising a plurality of pairs of plates, each pair spaced to delimit a thin passage therebetween through which one of said strips is moved, said plates being fixed at opposite sides to supporting members which close said thin passages at the sides of the moving strips, each of said plates having a resin supply channel transverse to the direction of movement of said strip and a series of distributing holes communicating said resin supply channel with one of said thin passages for coating the opposite sides of strips moving through the passages, each of said plates being provided with a vacuum chamber upstream of said resin supply channel for application of vacuum to an adjacent passage to cause impregnation of a strip moving therein, and sealing means at the entry end of each of said thin passages upstream of said vacuum chambers for cooperating with entering strips to prevent air leakage into the passages, said pairs of plates being carried by said supporting members in inclined relationship so that said thin passages converge toward a common line, and calendering means carried by said supporting members and located along said line to which said passages converge, whereby a plurality of strips respectively issuing from each thin passage are assembled together and simultaneously calendered.

3. A device as set forth in claim 1 wherein said sealing means comprises recesses in said plates at their upstream edges and opening into said thin passage, a pair of rollers mounted in said recesses, said rollers at least in part intercepting said thin passage whereby a moving strip is pressed between said rollers to partially close the passage, and flexible bands carried by said plates and bearing on said rollers to close the sides of said recesses paced away from said passage to thus completely close and seal the passage.

4. A device as set forth in claim 3 wherein said rollers are made of flexible material.

5. A device as set forth in claim 1 further comprising a lining for said thin passage made of non-sticking material carried by said plates and forming the surfaces of said passage from the level of said distributing holes to the downstream edge of the passage whereby sticking of a resin impregnated sheet is prevented.

6. A device as set forth in claim 1 further comprising a pair of concave recesses in said pair of plates, a bar located in said recesses and provided with an inner resin supplying duct and a series of distributing openings communicating said duct and said thin passage, whereby secondary passages are delimited by said plates and bar for simultaneous impregnation of a pair of reinforcing strips.

7. Device as claimed in claim 6 wherein said distributing holes in said plates and said distributing openings in said bar open into said passage at different levels.

8. Device as claimed in claim 6, wherein said bar comprises a plurality of spaced sections each having a resin supply duct and distributing openings, the spaces between said sections providing additional secondary passages for simultaneous coating of additional reinforcing strips.

References Cited by the Examiner

UNITED STATES PATENTS

| | | | |
|---|---|---|---|
| 2,410,126 | 10/1946 | Olson | 118—50 |
| 2,521,666 | 9/1950 | Knight | 118—50 |
| 3,053,310 | 9/1962 | Spooner | 156—543 |
| 3,084,662 | 4/1963 | Badger | 118—50 |

EARL M. BERGERT, *Primary Examiner.*

M. L. KATZ, R. I. SMITH, *Assistant Examiners.*